(12) United States Patent
Alves et al.

(10) Patent No.: US 8,705,758 B2
(45) Date of Patent: Apr. 22, 2014

(54) AUDIO PROCESSING DEVICE AND METHOD FOR REDUCING ECHO FROM A SECOND SIGNAL IN A FIRST SIGNAL

(75) Inventors: Rogerio Guedes Alves, Macomb, MI (US); Kuan-Chieh Yen, Northville, MI (US); Bryan Neilson, Belle River (CA)

(73) Assignee: Cambridge Silicon Radio Limited, Cambridge (GB)

( * ) Notice: Subject to any disclaimer, the term of this patent is extended or adjusted under 35 U.S.C. 154(b) by 947 days.

(21) Appl. No.: 12/103,728

(22) Filed: Apr. 16, 2008

(65) Prior Publication Data

US 2009/0225997 A1 Sep. 10, 2009

(30) Foreign Application Priority Data

Mar. 6, 2008 (GB) .................................. 0804204.6

(51) Int. Cl.
*H04B 3/20* (2006.01)
*H04M 9/08* (2006.01)

(52) U.S. Cl.
USPC .......................... 381/66; 370/286; 379/406.04

(58) Field of Classification Search
USPC ..................... 381/66, 92, 110, 93, 94.1, 94.3; 379/406.01–406.16; 370/286, 289
See application file for complete search history.

(56) References Cited

U.S. PATENT DOCUMENTS

| 4,600,815 | A * | 7/1986 | Horna ....................... 379/406.08 |
| 6,282,176 | B1* | 8/2001 | Hemkumar ................... 370/276 |
| 6,282,661 | B1* | 8/2001 | Nicol ............................ 713/300 |
| 7,180,892 | B1* | 2/2007 | Tackin .......................... 370/389 |
| 7,733,952 | B2* | 6/2010 | Agazzi et al. ................. 375/233 |
| 2001/0055985 | A1* | 12/2001 | Matt et al. ...................... 455/570 |
| 2003/0076948 | A1* | 4/2003 | Nishimura ............... 379/406.01 |
| 2004/0001450 | A1* | 1/2004 | He et al. ........................ 370/286 |
| 2004/0218755 | A1* | 11/2004 | Marton et al. ........... 379/406.14 |
| 2007/0280388 | A1 | 12/2007 | Torre et al. |
| 2011/0250932 | A1* | 10/2011 | Cohen et al. ............... 455/569.1 |

FOREIGN PATENT DOCUMENTS

WO     2008/028510 A1    3/2008

* cited by examiner

*Primary Examiner* — Daniel Luke
*Assistant Examiner* — Khaja Ahmad
(74) *Attorney, Agent, or Firm* — Frommer Lawrence & Haug LLP; John W. Branch

(57) ABSTRACT

An audio processing device for reducing the effect on a first signal of echo from a second signal, the device comprising: an echo reduction processor for processing the first signal to reduce echo in it, the echo reduction unit having: a first mode of operation for reducing echo of a first function from the first signal; and a second mode of operation for reducing echo of a second function from the first signal, the second function being more complex than the first function and the echo reduction processor being such as to consume more power in the second mode of operation than in the first mode of operation; and an echo reduction controller for controlling the echo reduction processor to operate in a selected one of the first mode of operation and the second mode of operation.

13 Claims, 1 Drawing Sheet

AUDIO PROCESSING DEVICE AND METHOD FOR REDUCING ECHO FROM A SECOND SIGNAL IN A FIRST SIGNAL

TECHNICAL FIELD OF THE INVENTION

This invention relates to implementing acoustic echo cancellation, for example in headsets.

BACKGROUND OF THE INVENTION

Hands-free communication devices such as Bluetooth headsets have increased in popularity in recent years. Many of these devices have audio capabilities and as new applications have been devised, various digital signal processing (DSP) algorithms have been designed to improve the audio performance of these devices. One of the features that are desirable for headset applications in particular is acoustic echo cancellation (AEC). This involves reducing echo effects that arise, for example, from crosstalk between a device's speaker and its microphone. Various AEC algorithms are already well described in the literature. However, many modern headsets are small and are powered from very limited energy sources such as miniature batteries. For these applications it would be desirable to reduce the power needed to perform AEC.

The need for AEC varies significantly across different models of headset and different operation conditions. First of all, acoustic coupling between the loudspeaker and the microphone differs significantly across different hardware models, due to the fact that each model: (1) has different distance between loudspeaker and microphone; (2) employs housing and assembly design that achieves different levels of acoustic and mechanical insulation; and (3) uses microphone and loudspeaker components that have different frequency responses and directivities. This diversity is further compounded by the variation of the signal level played out at the loudspeaker of any individual device due to the variation in received signal level and the availability of multiple volume settings. As a result, the level of echo presented at the microphone varies widely. In low volume and/or low coupling scenarios, the echo level can be so low that no AEC is required. In moderate scenarios, the echo problem can sometimes be mitigated with a linear AEC algorithm. In extreme scenarios, nonlinear compensation algorithms are needed, and could be implemented alongside linear AEC algorithms to deal nonlinear echo problems properly.

Simple AEC algorithms suffer from the problem that they provide relatively poor cancellation performance in non-linear situations. More complex AEC algorithms suffer from the problem that they involve relatively high power consumption. There is therefore a need for an improved mechanism for performing echo cancellation.

SUMMARY OF THE INVENTION

According to one aspect of the present invention there is provided an audio processing device for reducing the effect on a first signal of echo from a second signal, the device comprising: an echo reduction processor for processing the first signal to reduce echo in it, the echo reduction unit having: a first mode of operation for reducing echo of a first function from the first signal; and a second mode of operation for reducing echo of a second function from the first signal, the second function being more complex than the first function and the echo reduction processor being such as to consume more power in the second mode of operation than in the first mode of operation; and an echo reduction controller for controlling the echo reduction processor to operate in a selected one of the first mode of operation and the second mode of operation.

The audio processing device may include an amplitude controller for receiving a first input signal and applying gain or attenuation to the first input signal to form the second signal. The echo reduction controller may be configured to select in which of the first and second modes of operation to control the echo reduction processor to operate in accordance with the level of gain or attenuation applied to the input signal by the amplitude controller.

The amplitude controller may be configured to receive a gain control signal and to apply a level of gain or attenuation to the input signal in dependence on the gain control signal. The echo reduction controller may be configured to select in dependence on the gain control signal which of the first and second modes of operation to control the echo reduction processor to operate in. The gain control signal may be a volume control signal. The volume control signal may be input by a user as a volume control command. The gain control signal may be a digital signal. The echo reduction controller may then comprise a look-up table responsive to the gain control signal for selecting which of the first and second modes of operation to control the echo reduction processor to operate in.

The echo reduction controller may comprise a re-writable non-volatile memory. The echo reduction controller may be configured to operate in accordance with data stored in that memory to select in dependence on the gain control signal which of the first and second modes of operation to control the echo reduction processor to operate in.

The audio processing device may comprise means for determining a value representative of the average level of the first input signal over a predetermined period of time. The echo reduction controller may be responsive to that value for selecting which of the first and second modes of operation to control the echo reduction processor to operate in.

The amplitude controller may further include an automatic gain controller for applying automatic gain control to a second input signal to form the first input signal.

The first mode of operation may be such as to reduce echo in accordance with a linear function. The second mode of operation may be such as to reduce echo in accordance with a non-linear function.

The device may comprise a microphone and a loudspeaker, and may be configured to output the second signal via the loudspeaker and to receive the first signal from the microphone. The device may be a headset.

The echo reduction processor may have a third mode of operation in which it passes the first signal without performing echo reduction on it. The echo reduction controller may be capable of controlling the echo reduction processor to operate in a selected one of the first mode of operation, the second mode of operation and the third mode of operation.

According to a second aspect of the present invention there is provided a method for performing audio processing for reducing the effect on a first signal of echo from a second signal by means of a device comprising an echo reduction processor for processing the first signal to reduce echo in it, the echo reduction unit having: a first mode of operation for reducing echo of a first function from the first signal; and a second mode of operation for reducing echo of a second function from the first signal, the second function being more complex than the first function and the echo reduction processor being such as to consume more power in the second mode of operation than in the first mode of operation; the method comprising controlling the echo reduction processor to operate in a selected one of the first mode of operation and the second mode of operation.

BRIEF DESCRIPTION OF THE DRAWINGS

The present invention will now be described by way of example with reference to the accompanying drawings. In the drawings.

DETAILED DESCRIPTION OF THE INVENTION

Figure 1:
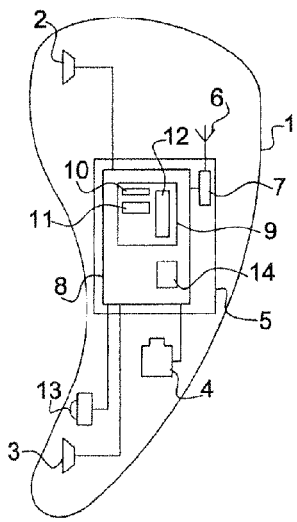
FIG. 1 is a schematic diagram of a wireless headset.

In this system to be described below, a power management mechanism has a number of different AEC processing modules available to it. It activates or deactivates them based on the needs of the current situation. This has the advantages of avoiding wasting power on running unnecessary modules, thus providing relatively low power consumption, whilst still allowing for adequate AEC performance even in complex situations. The strategy can also be implemented in a range of different hardware devices with few if any changes to its configuration and/or to the core AEC algorithm. This means that it can readily be ported to a range of ultimate products.

In a device that has a loudspeaker and a microphone, the level of acoustic echo from the loudspeaker that is presented at the microphone is essentially dependent on three factors:
1. the level of the receive-in signal arriving at the audio reproduction circuitry that drives the loudspeaker;
2. the volume control setting of the audio reproduction circuitry; and
3. the acoustic coupling between the loudspeaker and the microphone of the hardware device in question.

Volume control is often implemented digitally. In a digital implementation the user can select one of a finite set of possible levels. A pre-determined mapping implemented by a "volume table" is usually then used to map the selected level on to a respective gain (attenuation) factor that will be applied to the receive-in signal to generate the signal that drives the loudspeaker. Instead of a volume table, a function may be applied to determine the required gain/attenuation level for a selected volume setting. The level of acoustic coupling in a particular hardware device usually does not vary significantly under normal usage. It is therefore possible to determine for a particular device what level of acoustic echo would be produced at the microphone from a full-scale receive-in signal for every one of the available volume control settings. As the volume setting increases the level and complexity of the acoustic echo in the device can be expected to increase.

As an example, a particular headset model may have ten different volume levels. For one or more of the lowest volume levels (for example levels 1 to 5) no audible acoustic echo might present at the microphone. For one or more of the next-higher volume levels (for example levels 6 to 8) the acoustic echo at the microphone might be at such a level that it closely models a linear echo function. For one or more of the highest two volume levels (for example levels 9 and 10) the echo at the microphone might be due to a nonlinear echo function, possibly in addition to a linear function. To enhance power consumption the following strategy can then be used. AEC is completely turned off if the volume level is set at or below level 5; it uses only a linear approach in identifying the echo path if the volume level is set between levels 6 and 8; and it further supplements the linear approach with nonlinear compensation in estimating the echo path when the volume level is set at or above level 9.

Since a linear AEC algorithm can cope with no echo and a non-linear algorithm can cope in the essentially linear zone, one potentially advantageous option is to select an algorithm based on the worst potential echo performance at a particular volume setting. This involves selecting the proposed control mechanism based on the expected level of acoustic echo at microphone given full-scale receive-in signal.

Although this mechanism can greatly improve the power efficiency of AEC algorithms, unnecessary processing can still happen if the receive-in signal is significantly below full scale. Therefore, to further optimize power efficiency it may be useful to apply automatic gain control (AGC) to the receive-in signal with the effect of keeping its level close to full-scale and to let the volume control determine the desired receive level to be presented at the loudspeaker. Alternatively, if AGC is not implemented, a long-term power estimator can be implemented to average the amplitude of the input signal over a period such as a few seconds and thereby estimate how far the current receive-in signal is down from full scale. The thresholds for switching between different AEC mechanisms based on the volume settings can then be adjusted in accordance with that estimate. For example, if the threshold for switching from no AEC to linear AEC is normally between volume settings 4 and 5 and the long-term amplitude is determined to be 50% of full-scale then that threshold could be shifted to between volume settings 8 and 9. This could be implemented by a look up table that outputs a value representing the selected AEC mechanism in dependence on inputs representing the current volume setting and the long-term average power.

A potential advantage of this system is that the set of available AEC mechanisms can be the same across different headset models even though those models may have different echo characteristics. To adapt AEC to operate efficiently for a particular model the thresholds for switching between the available AEC mechanisms can be selected according to the type of echo characteristics that the particular device has at specific volume settings. In a practical implementation, the AEC mechanisms can be implemented in invariable hardware (for example on an integrated circuit) or by means of program code stored in an area of the integrated circuit that is only accessible to the manufacturer of the integrated circuit. The thresholds can be stored as firmware in non-volatile writable memory such as flash memory that is accessible to the end user or to an OEM manufacturer who builds the headset. In this way a single AEC processing device can readily be adapted for use with multiple user devices.

FIG. 1 illustrates a Bluetooth headset. The headset comprises a housing 1 designed to fit to a user's ear. The headset incorporates a loudspeaker 2, a microphone 3, a battery 4, a processing circuit 5 and an antenna 6. The processing circuit includes a Bluetooth block 7 which is coupled to the antenna and an audio block 8 which is coupled to the Bluetooth block and to the microphone and the loudspeaker. The processing unit could be an integrated circuit. In use, the Bluetooth block communicates audio data via Bluetooth with a remote device such as a user's cellular phone. Audio received from the cellular phone is processed by the audio block and passed to the loudspeaker for reproduction. Audio detected by the microphone 3 is passed to the audio block for processing and the result of that processing is passed to the Bluetooth block for onward transmission. The audio detected by the microphone may include echo from the loudspeaker. The audio processing block includes AEC means 9 for performing AEC. Those means could be in dedicated hardware or could be implemented by a microprocessor executing suitable code. The AEC means includes multiple blocks 10, 11 implementing respective AEC mechanisms and an AEC mode selector 12 which selects which of the blocks 10, 11 is to be used at any time. The mode selector operates in the manner described above, and accordingly receives input from a volume control 13 (which also controls the volume output by the loudspeaker for a given input amplitude) and a long-term averaging unit 14 which averages the long-term level of the input amplitude.

Figure 2:
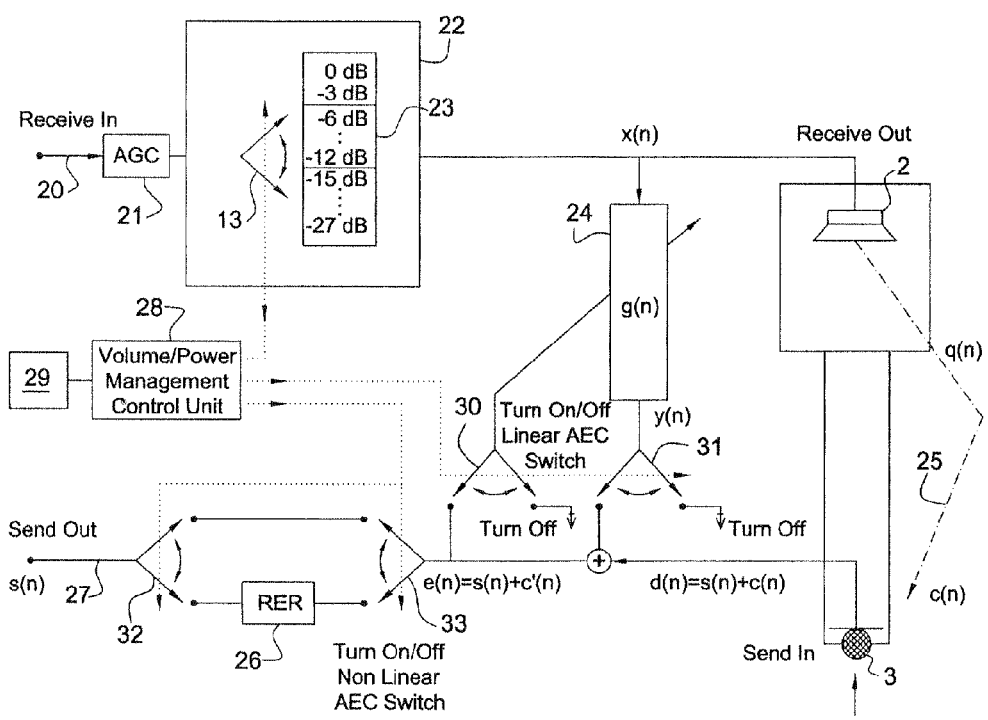
FIG. 2 is a power management block diagram for an AEC implementation in a headset.

FIG. 2 shows the apparatus in the headset of FIG. 1 in more detail. Like components are numbered as in FIG. 1. The receive-in signal 20 represents the audio signal received from the Bluetooth radio connection. That signal passes to an AGC block 21 which implements an automatic gain control algorithm on the received audio signal. The output of the AGC block is passed to a volume control block or amplitude controller 22 which controls the volume of the output audio signal by applying a gain or attenuation in accordance with a value looked up in a table 23 in dependence on the setting of the volume switch 13. In this example the volume table stores potential output values that range between 0 dB and −27 dB and represent the attenuation value to be applied to the AGC output signal. The output of the volume block, $x(n)$, represents the reference signal to be input to an adaptive filter $g(n)$ (24) and is also the output to the loudspeaker 2. $q(n)$ represents the acoustic echo path 25 between the headset loudspeaker 2 and microphone 3. Its cause can be both acoustical and mechanical and it may involve linear and/or nonlinear transformation. $c(n)$ represents the resulting echo signal that is fed back from the loudspeaker to the microphone. $s(n)$ represents the speech signal input by a user to the microphone. $g(n)$ is an adaptive filter, and it is used to identify the linear portion of the echo path $q(n)$. $y(n)$ is the output of the adaptive filter $g(n)$. $e(n)$ is the error signal used for the adaptation of the adaptive filter $g(n)$. $c'(n)$ represents the residual nonlinear portion of the echo $c(n)$ that cannot be cancelled by the linear adaptive filter $g(n)$. RER block 26 is a nonlinear echo reduction block or echo reduction processor that can suppress the residual echo $c'(n)$. The send-out signal 27 represents the output signal to be transmitted by the headset.

A management unit or echo reduction controller 28 controls the operation of AEC in the headset of FIG. 2. The management unit receives input from the volume switch 13, indicating the current volume setting. Based on that signal it performs a look up in look-up table 29 to determine whether to use linear and/or non-linear AEC at that volume setting. If linear AEC is to be used then the management unit turns on switch 30, which activates adaptive control of the filter 24, and turns on switch 31, which allows the filter to apply linear AEC to the signal from the microphone. Otherwise switches 30 and 31 are set to off. When the filter 24 is not in use it may be powered down. If non-linear AEC is to be used then the management unit turns switches 32 and 33 to their lower settings, switching RER unit into circuit so it can apply non-linear AEC to the signal from the microphone. Otherwise switches 32 and 33 are set to their upper settings, so the signal from the microphone bypasses the RER unit. When the RER unit is not in use it may be powered down.

An exemplary system operating according to the algorithm described above may operate as follows:

1. Attenuation values to be applied at the AGC output signal are defined in a volume table as a function of the volume control setting of the headset. If the headset has a ten-step volume control mechanism it may be found that for the lowest five attenuation levels (e.g. −27 dB to −15 dB), the headset does not present acoustic echo, for the next three attenuation levels (e.g. −12 dB to −6 dB), the headset presents linear echo, and for the highest two attenuation levels (e.g. −3 dB and 0 dB), the headset presents linear and nonlinear echo. The table is conveniently defined at manufacture, in which case it will be common to all devices of a particular model, or it could be defined during testing of a particular device so that its individual characteristics can be taken into account.

2. Optionally, during use AGC implemented in the digital time domain is applied at the receive-in (audio) signal received from the Bluetooth radio connection. The AGC is designed to provide gain to the audio signal such that the signal level is close to full scale of the DSP processor.

3. According to the volume level set by the headset user, a control mechanism decides if linear AEC should be switched on or off (i.e. if the adaptive filter $g(n)$ of FIG. 2 should be updated and applied or not) and if the nonlinear switch should be on or off (i.e. if the RER block of FIG. 2 should be enabled or not).

The audio processing described above may be implemented in dedicated hardware or in software, running for example on a DSP (digital signal processor), or in a mixture of both.

A Bluetooth headset implementing the power management strategy described above in software may use 4 MIPS (million instructions per second) for the audio processing system if the AEC is not necessary; 8 MIPS if only the linear portion of the AEC algorithm is necessary; and 10 MIPS if both the linear and nonlinear portions of the AEC algorithm are necessary for a determined headset model. This is achieved through reducing the DSP's power consumption by bypassing non-activated AEC functions A VAD (voice activity detector) unit, whose decision-making may for instance be based on the power received at the microphone, can be used to stop the selection of and the application of the linear and the nonlinear AEC algorithms when they are not needed. It may do this by detecting the presence of reference signal $x(n)$. This could further reduce computational complexity of the system in some situations.

When the audio processing for a device is implemented in a single block or on a single integrated circuit volume control information will normally be readily available to the AEC algorithm. However, if volume information is not available then an acoustic echo detector can be implemented in order to detect the level or type of echo and the output of that detector can be used as input to the management unit 28.

More information about suitable AEC algorithms for use in the system described above is described in copending U.S. patent application Ser. No. 10/914,898 filed Aug. 10, 2004, U.S. Pub. No. 2006/0034447, Feb. 16, 2006, incorporated herein by reference in its entirety.

The present AEC strategy is not limited to use with wireless headsets. It could be used in other applications such as cellular phones, landline phones, laptop computers and wired headsets. It may be especially advantageous in portable and/or battery powered applications where low power consumption is important for increasing usage time or portability. If the device has rechargeable batteries then the strategy described above may allow battery life, or in the case of Bluetooth headsets talk time between battery charges, to be extended.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An audio processing device for reducing the effect on a first signal of echo from a second signal, the device comprising:
   an echo reduction processor for processing the first signal to reduce echo in it, the echo reduction processor having: a first mode of operation for reducing echo of a first function of said second signal from the first signal; and a second mode of operation for reducing echo of a second function of said second signal from the first signal, the second function being more complex than the first function and the echo reduction processor being such as to consume more power in the second mode of operation than in the first mode of operation; and
   an echo reduction controller for controlling the echo reduction processor to operate in a selected one of the first mode of operation and the second mode of operation; wherein
   the audio processing device includes an amplitude controller for receiving a first input signal and applying gain or attenuation to the first input signal to form the second signal, and the echo reduction controller is configured to select in which of the first and second modes of operation to control the echo reduction processor to operate in accordance with the level of gain or attenuation applied to the first input signal by the amplitude controller, and wherein the amplitude controller further includes an automatic gain controller for applying automatic gain control to an input audio signal to form the first input signal.

2. An audio processing device as claimed in claim 1, wherein the amplitude controller is configured to receive a gain control signal and to apply a level of gain or attenuation to the first input signal in dependence on the gain control signal.

3. An audio processing device as claimed in claim 2, wherein the echo reduction controller is configured to select which of the first and second modes of operation to control the echo reduction processor to operate in dependence on the gain control signal.

4. An audio processing device as claimed in claim 2, wherein the gain control signal is a volume control signal.

5. An audio processing device as claimed in claim 2, wherein the gain control signal is a digital signal and the echo reduction controller comprises a look-up table responsive to the gain control signal for selecting which of the first and second modes of operation to control the echo reduction processor to operate in.

6. An audio processing device as claimed in claim 2, wherein the echo reduction controller comprises a re-writable non-volatile memory and the echo reduction controller is configured to operate in accordance with data stored in that memory to select in dependence on the gain control signal which of the first and second modes of operation to control the echo reduction processor to operate in.

7. An audio processing device as claimed in claim 2, comprising means for determining a value representative of the average level of the first input signal over a predetermined period of time and wherein the echo reduction controller is responsive to that value for selecting which of the first and second modes of operation to control the echo reduction processor to operate in.

8. An audio processing device as claimed in claim 1, wherein the first mode of operation is such as to reduce echo in accordance with a linear function.

9. An audio processing device as claimed in claim 1, wherein the second mode of operation is such as to reduce echo in accordance with a non-linear function.

10. An audio processing device as claimed in claim 1, wherein the device comprises a microphone and a loudspeaker, and the device is configured to output the second signal via the loudspeaker and to receive the first signal from the microphone.

11. An audio processing device as claimed in claim 1, wherein the device is a headset.

12. An audio processing device as claimed in claim 1, wherein:
   the echo reduction processor has a third mode of operation in which it passes the first signal without performing echo reduction on it; and
   the echo reduction controller is capable of controlling the echo reduction processor to operate in a selected one of the first mode of operation, the second mode of operation and the third mode of operation.

13. A method for performing audio processing for reducing the effect on a first signal of echo from a second signal, by means of a device comprising an amplitude controller for receiving a first input signal and applying gain or attenuation to the first input signal to form the second signal, and an echo reduction processor for processing the first signal to reduce echo in it, the echo reduction processor having: a first mode of operation for reducing echo of a first function of said second signal from the first signal; and a second mode of operation for reducing echo of a second function of said second signal from the first signal, the second function being more complex than the first function and the echo reduction processor being such as to consume more power in the second mode of operation than in the first mode of operation; the method comprising controlling the echo reduction processor to operate in a selected one of the first mode of operation and the second mode of operation in accordance with the level of gain or attenuation applied to the first input signal by the amplitude controller, and wherein the amplitude controller further includes an automatic gain controller for applying automatic gain control to an input audio signal to form the first input signal.

* * * * *